United States Patent [19]
Cook

[11] 3,740,645

[45] June 19, 1973

[54] CIRCUIT TESTING BY COMPARISON WITH A STANDARD CIRCUIT

[75] Inventor: Harold D. Cook, Wheaton, Ill.

[73] Assignee: Teletype Corporation, Skokie, Ill.

[22] Filed: Oct. 19, 1970

[21] Appl. No.: 81,914

[52] U.S. Cl. ............................................. 324/73 R
[51] Int. Cl. .......................................... G01r 15/12
[58] Field of Search ..................... 324/73 R, 73 AT, 324/133, 158 R

[56] References Cited
UNITED STATES PATENTS

| | | | |
|---|---|---|---|
| 3,614,608 | 10/1971 | Giedd | 324/73 |
| 3,286,175 | 11/1966 | Gerbier | 324/73 R |

*Primary Examiner*—Michael J. Lynch
*Attorney*—J. L. Landis and R. P. Miller

[57] ABSTRACT

A circuit for comparing a known electronic circuit card with an unknown card of similar type wherein clock pulses are delivered to a multistage binary counter which delivers its output identically to the inputs of the known card and to the corresponding inputs of the unknown card. The corresponding inputs and outputs of the known card and unknown card are compared with each other by a plurality of exclusive OR-gates which generate an error signal in the event of any disagreement between the two cards. A disagreement signal causes the termination of the operation of the binary counter. This permits an operator to note the input or output of the unknown card that did not agree with the corresponding input or output of the known card and to repair the unknown card.

3 Claims, 1 Drawing Figure

PATENTED JUN 19 1973
3,740,645
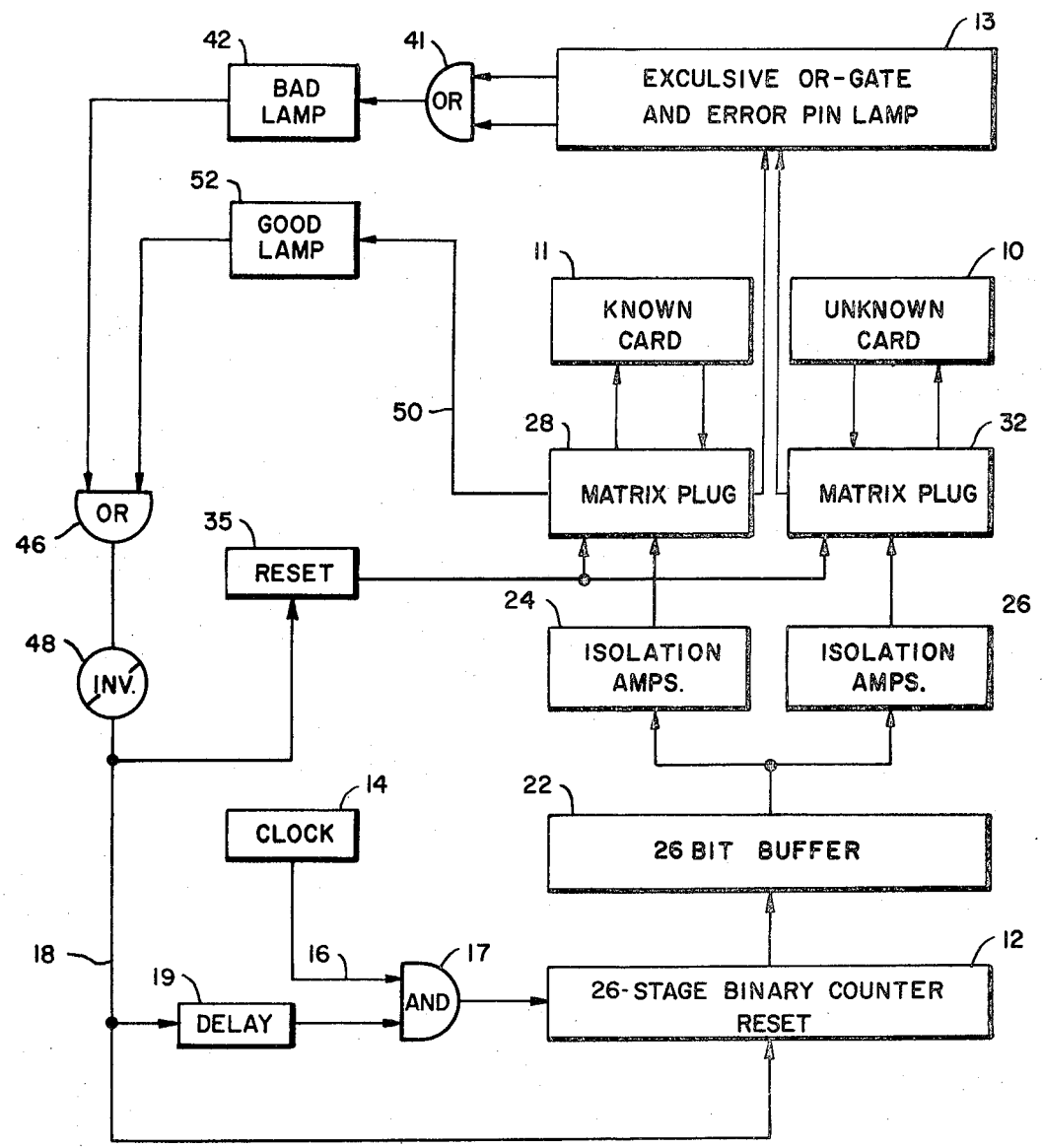
INVENTOR
HAROLD D. COOK
BY William K. Dossé
ATTORNEY 3,740,645

CIRCUIT TESTING BY COMPARISON WITH A STANDARD CIRCUIT

FIELD OF THE INVENTION

This invention relates to the testing of electronic circuits and more particularly to the testing of electronic circuits by comparing an electronic circuit that is known to be accurate and with a similar electronic circuit of unknown quality.

BACKGROUND OF THE INVENTION

In testing complex printed circuit cards made up of integrated circuit packages, manually testing one step at a time is very time consuming and expensive. It is well known that such tests can be programmed in an automatic tester or with the use of a digital computer. However, such programmed tests are very specialized and extremely expensive either to build for a specific card or to program on a computer. Such custom-built or programmed test systems are usually economically acceptable only for testing large quantities of identical cards. In the case of small quantities of many different kinds of cards, such automatic test sets according to the prior art are expensive on a unit basis and are thus undesirable.

Therefore, it is an object of the present invention to test an electronic circuit quickly and economically.

It is another object of the present invention to test an electronic circuit by comparing the electronic circuit with a similar circuit of known quality.

It is still another object of the present invention to compare an unknown electronic circuit with a known electronic circuit with a minimum of preparation and programming.

SUMMARY OF THE INVENTION

This invention relates to comparing a digital circuit of known quality with a similar digital circuit of unknown quality by applying a set of digital signals identically to both circuits, the digital signals being unrelated to the operations of the circuit; and comparing the outputs of the circuits to detect any disagreement.

BRIEF DESCRIPTION OF THE DRAWING

The present invention will be more fully understood by reference to the following detailed description when considered in conjunction with the accompanying drawing which shows a schematic block diagram of the preferred embodiment of the present invention.

DETAILED DESCRIPTION

The accompanying block diagram illustrates an automatic, binary-counter-controlled test set for comparing an unknown digital electronics card 10 with a card 11 of the same type which is known to be good and is known to function properly. In this test set the input terminals of both cards receive the same input digital signal conditions. These digital input signals preferrably represent the output of a binary counter 12, and are preferrably binary signals, but have no relationship to the function of the card. Functionally, these input signals resemble a random set of input conditions that are rapidly changed.

The output terminals and the input terminals of the known and unknown cards are compared in an exclusive OR-gate comparator 13 which alarms only if the unknown card 10 and the known card 11 do not respond identically to a given set of input conditions. Therefore, the parameters of the unknown card are themselves not tested, but the unknown card is simply compared with the known card under a rapidly-changing pattern of input conditions.

The card comparator shown on the accompanying drawing has a clock 14 which may be of any convenient output frequency. The output of the clock 14 is delivered on a conductor 16 to an AND-gate 17 which is normally provided with an additional input 18 through a very short delay 19. Consequently, the clock-pulse output of the AND-gate 17 is normally delivered to the input of the twenty-six-stage binary counter 12 which provides a normal and an inverted output from each stage to a twenty-six-bit buffer storage unit 22. The buffer storage unit comprises twenty-six bistable multivibrators or flip-flops and is well known in the prior art.

As soon as the binary counter 12 assumes a particular count, this count is transferred to the buffer storage unit 22. The output of the buffer storage unit 22 is delivered to two sets of isolation amplifiers 24 and 26. The outputs of one set of isolation amplifiers 24 are delivered to a matrix plug 28 which is arranged so that the 26 binary signals from the 26-bit buffer storage unit 22 are delivered to the input terminals of the known card 11. Similarly, the 26 signal outputs from the isolation amplifiers 26 are delivered to a matrix plug 32 which is wired to connect the outputs from the isolation amplifiers 26 to the input terminals of the unknown card 10.

It will be evident that the number of connections possible with the matrix plugs 28 and 32 should be adequate to connect any of the terminals of the known and unknown cards 11 and 10 to the isolation amplifiers 24 and 26 in order to accommodate any possible type of card. However, each of the matrix plugs 28 and 32 is wired in accordance with the particular type of card to be tested. The matrix plugs 28 and 32 are inserted into multiple pin sockets so as to provide the necessary interconnections from the isolation amplifiers 24 and 26 to the known and unknown cards 11 and 10, respectively. It will also be evident that each one of the stages of the buffer storage unit 22 that is connected through its associated one of the isolation amplifiers 24 to an input terminal on the known card 11 must also be connected through its associated one of the isolation amplifiers 26 to the corresponding input terminal of the unknown card 10. This is to insure that the known card and the unknown card always experience identical input conditions.

It will be evident that many types of circuit cards can simply be inserted into the present test apparatus and testing can begin. However, some types of circuit cards may have to be reset to some initial condition prior to the start of a test sequence. To accomplish this, a reset circuit 35 can be connected to the two matrix plugs 28 and 32. The reset circuit 35 resets the known card 11 and the unknown card 10 as soon as the additional input 18 is supplied to the delay circuit 19 which then provides the additional input to the AND-gate 17.

In the alternative, the additional input 18 can be applied to the binary counter 12 to reset the counter 12 to its initial condition. The first output from the counter 12 can then be used to reset the known card 11 and the unknown card 10 to some standard initial condition.

All of the terminals of the known card 11 and the unknown card 10 are connected to the plurality of exclusive OR-gates 13 which constantly monitor all of the inputs and the outputs of the two cards and compare them against each other. An exclusive OR-gate is well known in the prior art as being a two-input binary circuit which produces a given binary output condition if its two inputs receive identical binary signals and which produces the opposite binary output condition of two inputs receive different binary signals.

As long as each of the input and output terminals of the known card experiences exactly the same voltage condition as the corresponding terminal of the unknown card while the inputs to the two cards are provided with rapidly-changing input signals, the exclusive OR-gates 13 do not provide any output — or provide an output of one binary condition. However, if one of the terminals of the known card 11 differs in binary condition from the corresponding terminal of the unknown card 10, the associated one of the exclusive OR-gates 13 indicates this difference by producing an output of the opposite binary condition (error signal). An OR-gate 41 has an input from each of the exclusive OR-gates 13 and produces an output in response to the error signal. The output of the OR-gate 41 energizes a "bad" lamp circuit 42 which immediately illuminates a red light to indicate than an error was noted. The bad lamp circuit also sends a signal through an OR-gate 46 to an inverter 48 which causes the inverter to withdraw the normally enabling input on the conductor 18 from the AND-gate 17, thereby preventing further clock signals from reaching the binary counter 12.

Therefore, the binary counter 12 is stopped at the count at which a disagreement occurs between the known card and the unknown card. The bad lamp circuit 42 indicates the fact that the unknown card 10 disagrees with the known card 11. The exclusive OR-gate circuits 13 contain one lamp for each of the many exclusive OR-gates. Therefore, one lamp is provided for each of the connector terminals on each card. The lamp associated with the exclusive OR-gate that recognizes an error is then illuminated, indicating which terminals on the known card 11 and the unknown card 10 are in disagreement. This is an aid in trouble-shooting of the unknown card since most errors can readily be repaired.

If all of the inputs to the known and unknown cards are successfully energized according to the binary counter 12 without generating a single difference between the known card and the unknown card, the last count condition from the binary counter 12 causes the energization of a completion output 50 from the matrix plug 28 to energize a "good" lamp circuit 52. In addition to lighting a green lamp, the "good" lamp circuit 52 sends a signal through the OR-gate 46 to the inverter 48 which stops the binary counter 12 and thus indicates that the test has been successfully completed and that the unknown card is probably good.

It can be recognized that this test more resembles a random test than any particular programmed examination of an electronic circuit card. However, it can also be appreciated that this testing method can detect almost all of the possible errors in an unknown card. Using a binary counter to enter the random signals into the test set assures that all possible permutations of input conditions will be delivered to the test set in the minimum possible time. It can also be appreciated that very little programming of the test sequence is necessary in preparing the matrix plugs 28 and 32. The outputs from the isolation amplifiers 24 and 26 need simply be wired in a random fashion to the inputs of the known and unknown cards, although the two matrix plugs should be wired the same. The actual wiring of the plugs 28 and 32 can be made to pin sockets into which the known card and unknown card are manually inserted for test. By monitoring the inputs and the outputs of the cards with the exclusive OR-gates 13, shorted input terminals can also be detected as well as improper outputs from the circuit of the electronic card.

Although a particular embodiment of the invention is shown in the drawing and has been described in the foregoing specification, it is to be understood that other modifications of this invention, varied to fit particular operating conditions will be apparent to those skilled in the art; and the invention is not to be considered limited to the embodiment chosen for purposes of disclosure, and covers all changes and modifications which do no constitute departures from the true scope of the invention.

What is claimed is:

1. A test apparatus for testing a digital circuit by comparison with a corresponding standard digital circuit, each having a plurality of input terminals and output terminals, which comprises:

means for generating a series of digital signals;

first and second matrix plugs adapted to releasably couple with the plurality of input and output terminals of the circuit being tested and the standard circuit, respectively, so that insertion of the circuit being tested and the standard circuit into said first and second matrix plugs establishes connection thereto;

a plurality of amplifier pairs, each of said amplifier pairs coupling said generating means to said first and second matrix plugs so that one of said series of digital signals is applied to each of the input terminals of the circuit being tested and also to the corresponding input terminal of the standard circuit, for isolating the plurality of input terminals of the circuit being tested from the plurality of input terminals of the standard circuit so that defects in the circuit being tested do not influence the operation of the standard circuit;

a first plurality of gate circuits coupled to said first and second matrix plugs so that each of said first plurality of gate circuits is coupled to one of the input terminals of the circuit being tested and also to a corresponding input terminal of the standard circuit, for comparing each input signal of the circuit being tested with the corresponding input signal of the standard circuit and for providing an output signal indicative of which of the input signals of the circuit being tested are not identical to the corresponding input signals of the standard circuit;

a second plurality of gate circuits coupled to said first and second matrix plugs so that each of said second plurality of gate circuits is coupled to one of the output terminals of the circuit being tested and also to a corresponding output terminal of the standard circuit, for comparing each output signal of the circuit being tested with the corresponding output signal of the standard circuit and for providing an output signal indicative of which of the output signals of the circuit being tested are not identical to the corresponding output signals of the standard circuit; and a plurality of indicating circuits, each of said plurality of indicating circuits coupled to each of said first and second plurality of gate circuits and responsive to the presence of said output signals therefrom, for individually indicating which of said input and output signals of the circuit being tested are not identical to said corresponding input and output signals of the standard circuit thereby facilitating repair of the circuit being tested by identifying which of said input and output terminals are associated with defective portions of the circuit being tested.

2. A test apparatus as defined in claim 1 which further comprises means responsive to the presence of said indication from any of said plurality of comparing and indicating circuits for stopping said generating means.

3. A test apparatus as defined in claim 2 which further comprises means for resetting the circuit being tested and the standard circuit to an initial condition.

* * * * *